2,961,338

PROCESS FOR TREATING WOOL AND OTHER FIBROUS MATERIALS TO IMPART WATER REPELLENCY AND RESISTANCE TO SHRINKAGE

Edward Robbart, 42 Bailey Road, Watertown 72, Mass.

No Drawing. Filed May 7, 1958, Ser. No. 733,487

6 Claims. (Cl. 117—55)

This invention relates to the treatment of wool and other fibrous materials and provides a novel process of treating material of that type for the purpose of imparting water repellency and stabilization against shrinkage.

It has long been known that materials of various types may be rendered water repellent by exposing them to the vapors of an organo silicon halide, for instance as disclosed in U.S. Patent No. 2,306,222. The treatment is believed to result in a reaction between the organo silicon halide and the film of moisture normally present on the surface of the article such that there is formed a surface film of an organo siloxane. This process affords a particularly convenient and desirable means of rendering materials water repellent because of the simplicity of carrying out the process and because the film of siloxane is extremely thin and does not adversely interfere with the desired properties of the material being treated.

Attempts to treat wool by exposure to organo silicon halide vapors however have not proved to be satisfactory. Although the treatment results in an initial water repellency, subsequent washings of the wool destroy this effect and cause the wool to revert to its original hygroscopic condition. Apparently the siloxane formed when the wool is exposed to the organo silicon halide does not adhere to the wool through normal washing operations. Consequently, although there are numerous processes of treating woolen fabrics to render them water repellent, none is available which is as simple of application and as free of interfering with the desired wool properties as that attained by exposure to organo silicon halide vapors.

Investigations leading to the present invention indicate that the high moisture content of wool under the conditions encountered in wool processing operations are at least in part responsible for the low adherence of the siloxane. Under normal processing conditions the moisture content or "regain" of wool will be upwards of 12 percent on the dry weight and generally much higher, and conditions in wool processing plants are carefully controlled to maintain this regain. The present invention is based on the discovery that if the moisture content of the wool is initially reduced and the wool is then exposed to vapors of an organo silicon halide, a permanent and durably adherent siloxane component will be formed which is effective not only to render the wool water repellent, but also to render it shrink resistant even to the point of permitting it to be immersed in boiling water. Apparently as moisture is removed, that remaining in the wool structure is more securely bonded thereto and in reacting with the organo silicon halide provides a more intimate association between the siloxane and the wool fiber. A possible hypothesis is that the removal of moisture from the surface of the wool fibers results in a reaction by which the siloxane component is at least partly within the fibers, and is not merely a surface coating.

The process accordingly consists in treating the wool at some time in the course of its processing to reduce its moisture content or regain to below 10, and preferably to about 4–7 percent on the dry weight, and in then exposing the preliminarily dried wool to the vapors of an organo silicon halide, such as in the manner disclosed by Patnode in U.S. Patent No. 2,306,222, or more preferably in the manner disclosed in U.S. Patents Nos. 2,782,090 and 2,824,778. Reducing the moisture content of the wool can most readily be done by bringing the wool into contact with an ambient atmosphere of low relative humidity, preferably at an elevated temperature such that drying is accelerated. In this connection it should be noted that the equilibrium moisture content of less than 10 percent will be achieved at room temperature only if the relative humidity is less than about 35 percent. Conditioning of wool at such a low relative humidity departs markedly from universal wool processing practice in that in such practice the ambient atmosphere is always maintained at a relative humidity well in excess of 50 percent at room temperature. The wool may be treated at any stage of the manufacturing process, either before or after it is spun and woven, but most conveniently the treatment will be carried out on either spun yarns or woven fabric.

As the moisture content is reduced the adherence of the siloxane component is increased. However, since the siloxane component is believed to be formed largely by reaction of the organo silicon halide with the moisture in the wool, the amount of siloxane that can be formed also decreases as the moisture content is reduced. Water repellency can be imparted with as little as 1 percent or less of water in the wool, but the amount of siloxane will be quite small. Best results seem to be attained if the moisture content is not reduced as low as possible.

In a typical method of treatment, wool in process as yarns or fabric is first fed through a pre-conditioning chamber maintained at an elevated temperature and low relative humidity to reduce the moisture content to about 4–7 percent on the dry weight. This may be done in a single step, or the wool may be dried to a lower moisture content and then passed through an equilibrating chamber maintained at room temperature and having a humidity sufficient to bring the regain up to the proper amount. The wool is then passed through a chamber in which is maintained an atmosphere of an organo silicon halide. This latter treatment is most suitably carried out at room temperature in a chamber supplied with an aerosol mixture of the halide in the form of dispersed liquid droplets suspended in an inert gas which is mixed with halide vapors, as generally disclosed in U.S. Patent No. 2,824,778. By providing the silicon halide in the form of an aerosol mixture, the vapor phase of that mixture is maintained under substantially saturated conditions and the dispersed droplets serve as minute reservoirs of liquid which evaporate to replenish the vapor that is used up in the processing. Constant and uniform conditions of vapor phase saturation are thus provided which assure a uniform treatment of the wool.

After exposure to the silicon halide vapors the wool is preferably neutralized and washed or rinsed to remove the hydrogen halide acid by-products formed during the reaction, and is then dried and further processed as may be desired. Neutralization and washing of the wool are desirable and may be necessary if the acid reaction by-products are objectionable or interfere with subsequent processing, such as drying. However, wool is not seriously damaged by acid conditions.

Any of the organo silicon halides may be employed in the process of this invention since they as a class are known to hydrolyze in the presence of moisture to form a water repellent organo siloxane. In particular those described by Patnode in U.S. Patent No. 2,306,222 are suitable, but the organo silicon halides having lower alkyl substituent groups of between 1 and 4 carbon atoms are preferred, such as the methyl silicon halides, ethyl silicon halides, propyl silicon halides, vinyl silicon halides, or butyl silicon halides.

Preferably the organo silicon halide will comprise a mixture which is reactive with water to form a polymeric siloxane, and since cross-linked silicones are preferred to the linear polymers, the mixture will include a silicon halide having three or four halogen atoms through which cross links between the polymeric chains may be formed. Typically the organo silicon halide will comprise a mixture of methyl chloro silanes such as dimethyl dichlorosilane, methyl trichlorosilane, trimethylchlorosilane, together with some silicon tetrachloride and methyl dichlorosilane. In such a mixture the methyl trichlorosilane, silicon tetrachloride, and methyl dichlorosilane will provide for adequate cross linking. In addition the corresponding ethyl and propyl compounds are suitable, as are the corresponding bromo and fluoro compounds except for their higher expense and the dangerous nature of the latter.

In addition to wool, other similar keratinous materials may be treated in a similar manner, such as hair and mohair, alpaca, cashmere, camel's hair, silk and the like. Moreover, similar beneficial results from preliminarily reducing the moisture content of the fiber before exposure to vapors of an organo silicon halide, for the purpose of increasing the adherence of the polysiloxane to the fiber, may be achieved with numerous synthetic fibers such or Orlon (acrylic fiber), Dacron (polyester fiber) and nylon (superpolyamide fiber). Accordingly, while this invention is described with specific reference to wool, wherein its greatest benefits are realized, it will be appreciated that aspects of it are equally applicable to these other fibers.

This invention is described in detail below with reference to a specific example setting forth a preferred embodiment selected for purposes of illustration.

In treating woolen fabrics, the fabric as it leaves the loom or at some other stage of its manufacturing process is passed through a drying chamber maintained at a temperature of about 200° F. and a relative humidity of 30 percent or less. The fabric is passed through the chamber at a rate such that during its dwell therein its regain is reduced from an initial 12–14 percent on the dry weight to from 4 to 7 percent on the dry weight. Typically this will require from about 1 minute to perhaps an hour depending on the air velocity, nature of the fabric yarn and weave and other conditions. The wool is then passed through a chamber into which is continuously introduced an aerosol dispersion of a mixture consisting predominantly of methyl trichlorosilane and dimethyl dichlorosilane (G. E. Dri-Film, sold by the General Electric Company, Schenectady, N.Y.), formed by atomizing the silane in a stream of dry air to form a noticeable fog in the chamber. The silane is supplied at a rate equal to about 2 parts by weight per part of wool treated. The chamber is maintained at about room temperature (70° F.) and the fabric is caused to dwell therein for a time sufficient for the wool fibers to react with the silane vapors, generally between about 1 and 5 minutes being adequate. On emerging from the chamber the fabric is passed through a rinsing bath of warm water (100° F.) containing sodium bicarbonate and a small amount of a wetting agent, e.g. about 0.02 percent by weight of non-ionic detergent such as Triton X100 (sold by Rohm & Haas Co., Philadelphia, Pa., and described as an alkyl aryl polyether alcohol). The fabric is then rinsed in water, dried and further processed in the conventional manner.

Following this treatment it will be found that the wool is highly water repellent and that it may be washed repeatedly in soap and water without destroying its water repellent characteristics. Moreover, the treatment greatly improves the resistance of the wool to shrinkage as will be seen by immersing a sample of the fabric in boiling water.

From the foregoing description it will be seen that this invention provides a remarkably simple means of imparting water repellent characteristics to wool. The mechanisms suggested are presented as possible hypotheses to explain the reaction, but it is to be understood that this invention is in no way limited to these hypotheses.

Although this invention has been described with reference to preferred embodiments, it is contemplated that obvious modifications will occur to those skilled in the art and that such can be made without departing from the scope of this invention. In particular it is pointed out that various degrees of water repellency, shrinkage stabilization and permanence of the treatment may be desired and that for any particular treatment according to the teaching of this disclosure some experimentation with different organo silicon halides and with different degrees of preliminary drying will be necessary to the attainment of an optimum process. It is considered that any process thus devised will come within the scope of this invention.

Having thus disclosed my invention and described in detail a preferred embodiment thereof, I claim and desire to secure by Letters Patent:

1. The method of treating wool in process having a regain in excess of about 12 percent on its dry weight, to render said wool water repellent and shrink resistant, comprising drying said wool until its regain is in an amount less than 10 percent on its dry weight but at least sufficient to react with an organo silicon halide to render said wool water repellent, and thereafter contacting said wool with vapors of an organo silicon halide until the wool is rendered water repellent.

2. The method of treating wool in process having a regain in excess of about 12 percent on its dry weight to render said wool water repellent and shrink resistant, comprising bringing and maintaining said wool in contact with an atmosphere of reduced humidity and elevated temperature until the regain is between about 4 and 7 percent on its dry weight, and then contacting the wool with vapors of an organo silicon halide until the wool is rendered water repellent.

3. In the treatment of keratinous fibers having a moisture content in excess of about 12 percent based on the dry weight of said fibers, wherein said fibers are exposed to vapors of an organo silicon halide which is reactive to impart water repellency to said fibers: the improvement comprising drying said fibers until the moisture content is an amount less than about 10 percent based on the dry weight of said fibers but at least sufficient for reaction with said organo silicon halide, and thereafter contacting said fibers with said vapors of organo silicon halide until said fibers are rendered water repellent.

4. The method defined by claim 3 wherein the fibers are dried to a moisture content between 4 and 7 percent based on the dry weight of said fibers.

5. In the method of treating wool having a regain in excess of about 12 percent on its dry weight, wherein said wool is exposed to vapors of an organo silicon halide reactive with said wool to impart water repellency: the improvement comprising drying said wool until its regain is in an amount less than 10 percent on its dry weight but at least sufficient to react with said organo silicon halide to render said wool water repellent, and thereafter contacting said wool with an atmosphere comprising an aerosol dispersion of liquid particles of said organo silicon halide dispersed in an inert gas mixed with vapors of said organo silicon halide until said wool is rendered water repellent.

6. The method defined by claim 5 wherein the wool is advanced continuously into contact with the atmosphere.

References Cited in the file of this patent

UNITED STATES PATENTS

| | | |
|---|---|---|
| 2,306,222 | Patnode | Dec. 22, 1942 |
| 2,738,290 | Janes | Mar. 13, 1956 |
| 2,774,690 | Cockett et al. | Dec. 18, 1956 |
| 2,775,605 | De Benneville | Dec. 25, 1956 |
| 2,782,090 | Robbart | Feb. 19, 1957 |
| 2,782,790 | Hersh et al. | Feb. 26, 1957 |
| 2,808,340 | Learn | Oct. 1, 1957 |
| 2,833,022 | Collings | May 6, 1958 |